United States Patent
Vilain

[15] 3,648,514
[45] Mar. 14, 1972

[54] MEANS FOR MEASURING FORCES, NOTABLY AT THE FOOT OF AN OSCILLATING COLUMN OR AN OFFSHORE DRILLING PLATFORM

[72] Inventor: Robert H. Vilain, Maisons-Alfort, France

[73] Assignee: Compagnie Francaise D'Enterprises Metalliques, Paris, France

[22] Filed: Nov. 20, 1969

[21] Appl. No.: 878,459

[30] Foreign Application Priority Data

Nov. 20, 1968 France..................................174,568

[52] U.S. Cl.............................................................73/100
[51] Int. Cl........................................................G01l 5/00
[58] Field of Search ..............................73/189, 100, 139, 88

[56] References Cited

UNITED STATES PATENTS 2,759,356  8/1956  Blackmon et al........................73/65
2,900,818  8/1959  Starr......................................73/88 F

*Primary Examiner*—Jerry W. Myracle
*Attorney*—Fleit, Gipple & Jacobson

[57] ABSTRACT

An offshore drilling platform, having a column attached through a universal joint and a bottom coupling block to a base fixed to the seabed, the connection between the bottom coupling block and said base being effected through at least three points, by two members at each point, including systems for measuring the forces exerted on the base at said three points at least, thereby to deduce the magnitude and direction of the hydrodynamic force exerted on the column, each said system comprising in combination a flexural element forming part of means for securing said members together, a nonflexing rod borne within and fixed by one end to said element, and a sensor located adjacent the free end of the rod so that the displacements of said free end of the rod relative to said element are transmitted to said sensor.

6 Claims, 5 Drawing Figures

Patented March 14, 1972

INVENTOR
ROBERT H. VILAIN
BY
Fleit, Gipple & Jacobson
ATTORNEYS

MEANS FOR MEASURING FORCES, NOTABLY AT THE FOOT OF AN OSCILLATING COLUMN OR AN OFFSHORE DRILLING PLATFORM

The present invention relates to means for measuring forces exerted between at least two elements, and more particularly the forces generated between the foot of an oscillating offshore drilling platform column and the base to which the same is attached (notably in the case of structures of the kind disclosed in French Pat. No. 1,519,891).

The invention has for its object to permit a constant monitoring of such forces exerted between two members or parts of the same structure and accordingly to cause at least one element deformable by bending (notably a latching member) to be inserted between said parts, to associate to said element (within it, for example) a rod not subjected to bending, and to cause suitable sensing means to measure the relative movements between said element and said rod, which movements provide a measurement of the forces involved.

The invention additionally includes a number of teachings to be preferably applied at the same time and to which reference in greater detail will be made hereinafter, and most notably:

a second teaching—specifically relevant to offshore drilling platforms and the like having a column attached, more particularly by means of a universal joint, to a base fixed to the seabed—consisting in interconnecting the lower coupling-block of the column and the base at three points at least, and in providing means, notably the subject means of this invention, for measuring the forces exerted on the base at those three points and thereby deducing both the magnitude and the direction of the resultant hydrodynamic force exerted on the column.

The invention relates most notably to certain applications (in particular for measuring the hydrodynamic forces exerted between a supporting column of the above-mentioned type and its base) and to certain forms of embodiment of the said teachings.

The description which follows with reference to the accompanying nonlimitative exemplary drawings will give a clear understanding of how the invention can be carried into practice.

Figure 1:
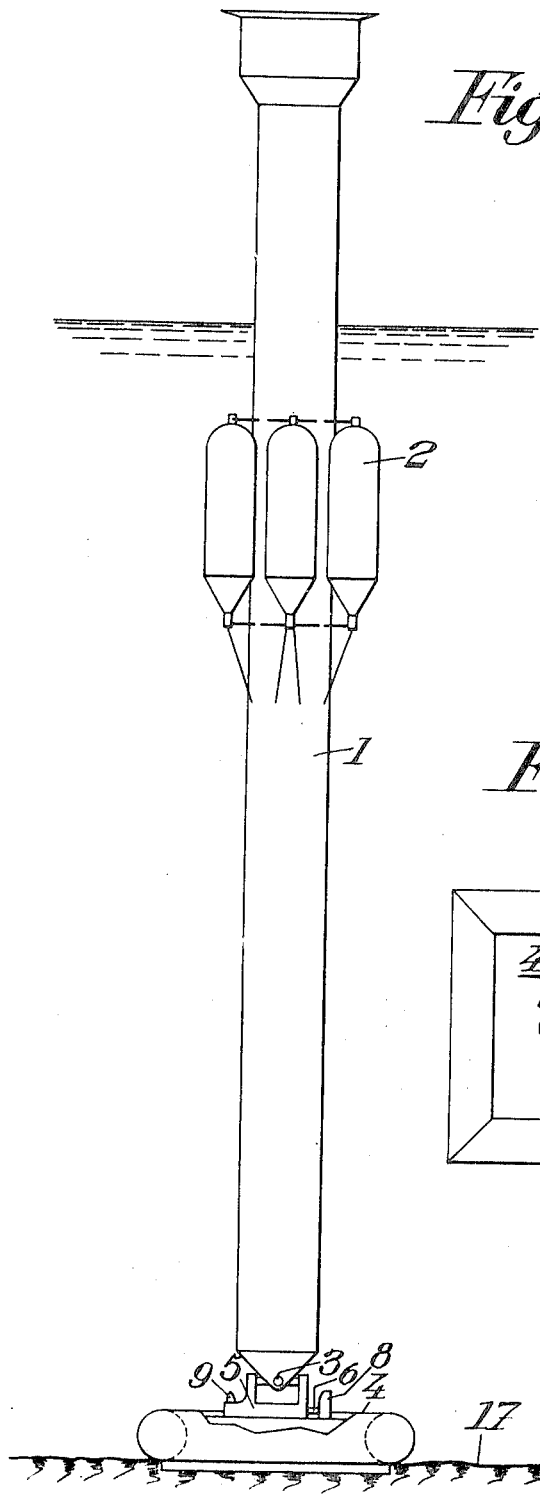
FIG. 1 shows in diagrammatic side elevation an offshore drilling platform with its column and its base, which platform includes means in accordance with the present invention for determining the hydrodynamic forces exerted on the column.
Figure 2:
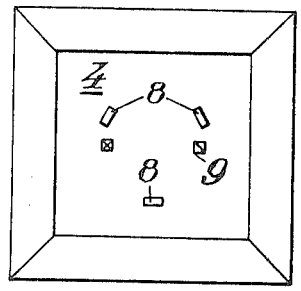
FIG. 2 is a schematic plan view of said base.

Reference is had to the accompanying drawings for a portrayal of an offshore drilling platform comprising a column 1 with buoyancy floats 2, the column 1 being connected through a universal joint to a weighted base 4 fixed to the seabed 17, it being required to provide means for determining the variations, as a function of the environmental conditions (wind, swell, etc.), in the hydrodynamic forces exerted on the entire column.

It is assumed on the drawings that the lower coupling-block 5 designed to be articulated to column 1 by means of universal joint 3 is fixed to the base 4 by means of latches 6 which can be operated by a jack 7 and are adapted to engage into openings formed in attachment members 8 fast with the base 4. Reference numeral 9 designates guiding elements for cables used for setting down the coupling-block, in accordance with the teachings disclosed in the above-cited patent.

Responsively to the hydrodynamic forces exerted on the column resting through universal joint 3 on coupling-block 5 and base 4, vertical reactions are generated between the latches 6 and attachment members 8.

In accordance with the present invention, these reactions are measured in order to deduce therefrom the magnitude of the resultant hydrodynamic force exerted on the column.

If, in particular, the latches 6 or the elements used in lieu thereof are three in number and angularly spaced at 120° about the central axis, it will readily be possible to determine both the magnitude and the direction of said resultant hydrodynamic force from the three reaction components on said latches.

These components are measured by means of the bending deformations of said latches responsively to said reactions exerted between latches 6 and attachment members 8, and to this end each of said latches has associated thereto a suitably rigid rod 10 not substantially subjected to bending, means being provided to measure relative motion between the latches and at least one point on the rod, for instance at a free end thereof.

Figure 3:
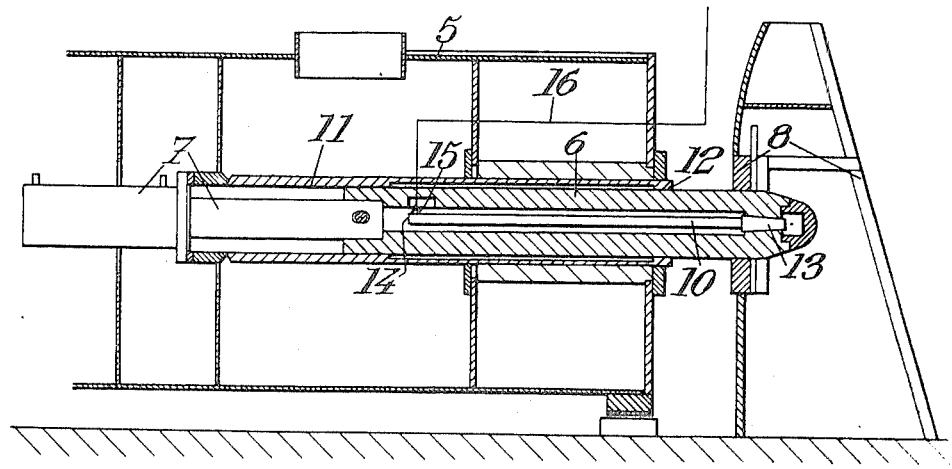
FIGS. 3 and 4 show on an enlarged scale, in vertical section and in partial plan view respectively, said base equipped with means according to this invention for determining the forces exerted at the thrust points of the column on its base.
Figure 4:
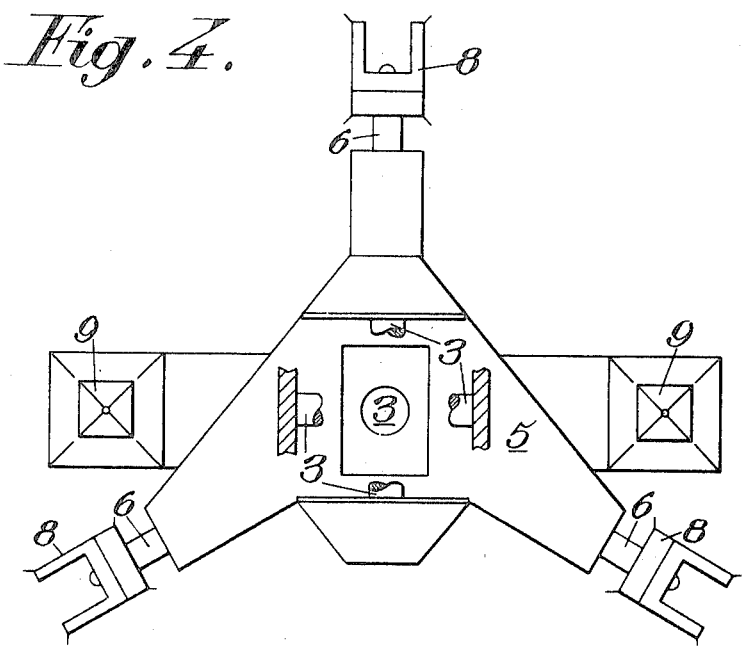

In a preferred embodiment shown in FIG. 3, each latch 6, carried between two suitable supports or bearings 11, 12, is of hollow shape whereby to allow said latch to be inserted thereinto, one end of the rod being secured into the nose of the latch 13 and the other end 14 left free, and said means for measuring relative motion between the latch and the rod, responsively to bending deformation of the latch, are interposed therebetween.

Because it is supported between two bearings 11, 12 which leave a certain annular space between them externally of it, said latch is free to deform in the bending mode responsively to the end reaction applied by attachment member 8. The rod 10, on the contrary, is not stressed since a suitable clearance exists initially between the bore in the latch and said rod. This results in relative movement between the rod (notably its end 14) and the wall of said bore, and this is the movement that is measured.

The means to that end can be devised in any convenient manner, by resorting to a sensor 15 which may be for example either of an essentially mechanical type, consisting in particular of a lever 17 capable of assuming different orientations according to the relative positions of the elements 14 and 6, which orientations are communicated through a link 18 or any other convenient means (FIG. 5), or of an electrical or electromechanical type and include for example a piezo-electric crystal or a strain-gauge device or any convenient electromechanical transducer unit subjected to pressures which vary with the relative motions of the rod 10 and the latch 6, whereby to produce a variable resistance in an electric circuit.

Regardless of the embodiment adopted, the indications issuing from sensor 15 are caused to be transmitted over a distance, preferably in the form of an electric signal along a suitable cable 16, though it would manifestly be possible to alternatively cause a force to be transmitted through pneumatic or hydraulic channels.

Figure 5:
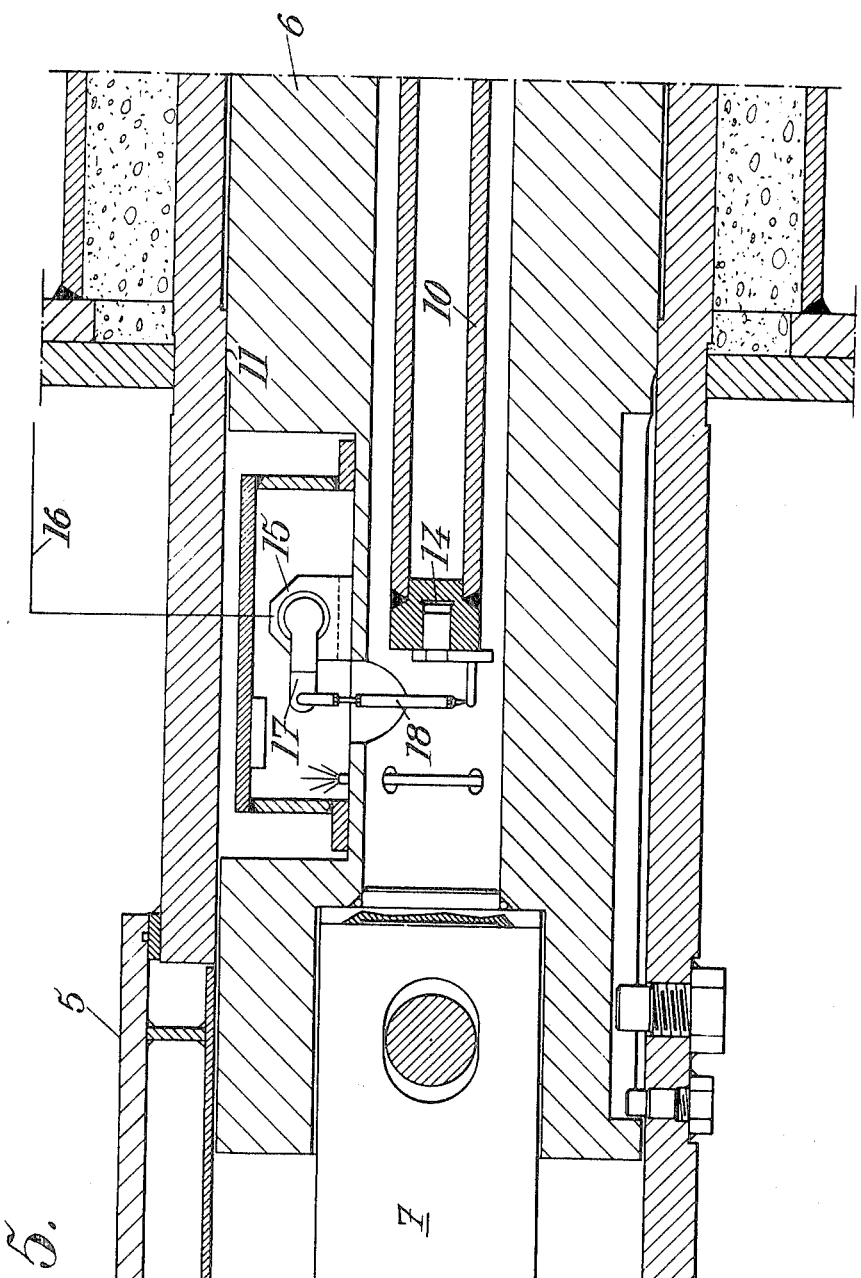
FIG. 5 is a separate and fragmental showing on an enlarged scale of an embodiment of said means.

In the event of recourse to a mechanical sensor of the kind shown in FIG. 5, changes in the angular position of the lever 17 are transmitted over a distance either by a transducer device such as a transformer, a selsyn, or the like, the induction of which varies with said angular position, or in any other convenient manner.

It will be possible in this way to receive three signals on the platform, the magnitudes of which will depend on the three reactions at the thrust points 8 and which can be used:

either on separate receivers, thereby enabling the magnitude and direction of the resultant hydrodynamic force on the column to be calculated, or on a single appropriate reading instrument devised to display directly both the magnitude and the direction of said resultant force, such an instrument being readily designable by the specialist in the art.

Should the reaction components on the three thrust points be equal at any time, this would indicate that the hydrodynamic resultant passing through the center of gravity also passes through the center of universal joint 3, the column being vertical like said resultant. If on the contrary said components are unequal, this would indicate that the hydrodynamic resultant is tending to slant under the effect of the swell.

Irrespective of the form of embodiment, it is accordingly possible to provide means enabling both the magnitude and the direction of the hydrodynamic resultant exerted on a platform of the kind referred to hereinabove, i.e., upon its column, to be known at all times.

Manifestly, the means employed, which are particularly simple, are applicable also to any other structure wherein it is required to measure forces based on the bending of an element.

It goes without saying that many changes and substitutions of parts could be made in the specific embodiments hereinbefore described without departing from the scope of the invention.

What is claimed is:

1. A system for measuring the forces exerted between two members or two parts of a structure, comprising, in combination, a flexural element forming part of means for securing said parts together, a non-flexing rod borne within and fixed by one end only to said element so as to be free from longitudinally applied load, the other end of the rod being arranged so as to be free to undergo lateral displacements, relative to said element and a sensor located adjacent the free end of the rod, so that the lateral displacements of said free end of the rod relative to said element as the result of flexing of said flexural element are transmitted to said sensor.

2. A system according to claim 1, wherein the flexural element is a hollow bolt adapted to engage said securing means, the free end of the rod acting on the sensor.

3. A system according to claim 1, wherein the sensor generates electrical signals transmittable over a distance.

4. A system according to claim 3, wherein the sensor is of the piezo-electric type.

5. A system according to claim 3, wherein the sensor is of the mechanical or electromechanical type.

6. An offshore drilling platform having a column attached through a universal joint and a bottom coupling block to a base fixed to the seabed, the connection between the bottom coupling block and said base being effected through at least three points, by two members at each point, including systems according to claim 1 for measuring the forces exerted on the base at said three points at least, thereby to deduce the magnitude and direction of the hydrodynamic force exerted on the column.

* * * * *